US009376023B2

(12) United States Patent
Messerschmidt

(10) Patent No.: US 9,376,023 B2
(45) Date of Patent: Jun. 28, 2016

(54) SYSTEM FOR AUTOMATICALLY CONNECTING AND A DISCONNECTING CATENARY VEHICLE TO AND FROM THE OVERHEAD LINE DURING TRAVEL

(75) Inventor: Jan Messerschmidt, Saarbrücken (DE)

(73) Assignee: DIaLOGIKa Gesellschaft für angewandte Informatik mbH, Saarbrücken (DE)

( * ) Notice: Subject to any disclaimer, the term of this patent is extended or adjusted under 35 U.S.C. 154(b) by 0 days.

(21) Appl. No.: 13/990,422

(22) PCT Filed: Nov. 24, 2011

(86) PCT No.: PCT/DE2011/002058
§ 371 (c)(1),
(2), (4) Date: May 29, 2013

(87) PCT Pub. No.: WO2012/072067
PCT Pub. Date: Jun. 7, 2012

(65) Prior Publication Data
US 2013/0245876 A1 Sep. 19, 2013

(30) Foreign Application Priority Data

Nov. 30, 2010 (DE) .......................... 10 2010 053 528

(51) Int. Cl.
B60L 9/00 (2006.01)
B60L 5/04 (2006.01)
B60L 5/16 (2006.01)

(52) U.S. Cl.
CPC . B60L 5/04 (2013.01); B60L 5/045 (2013.01); B60L 5/16 (2013.01); B60L 2200/26 (2013.01)

(58) Field of Classification Search
USPC .......................................................... 701/22
See application file for complete search history.

(56) References Cited

U.S. PATENT DOCUMENTS 6,557,476 B2 * 5/2003 Batisse .......................... 104/289
8,324,858 B2 * 12/2012 Hill et al. ...................... 320/109
(Continued)

FOREIGN PATENT DOCUMENTS

CH         596011  A5   2/1978
CN      101746284       6/2010
(Continued)

OTHER PUBLICATIONS

Written Opinion of the International Searching Authority dated Nov. 26, 2012 for corresponding PCT/DE2011/002058.
(Continued)

Primary Examiner — Hussein A. Elchanti
(74) Attorney, Agent, or Firm — Lempia Summerfield Katz LLC

(57) ABSTRACT

A method and device for automatically connecting and disconnecting a current collector of a vehicle which is designed for operating with an overhead line. The invention specifies a device and a method for automatically connecting and disconnecting at least one current collector (3) of a vehicle which is designed for operation with at least one overhead line (1). The device comprises at least one actuator (9), which moves the current collector (3), and at least one image-capturing and image-evaluation unit (6 and 7), which controls the actuator (9) in such a way that the current collector (3) is connected or disconnected to or from the overhead line (1). The invention provides the advantage that current collectors of a vehicle can be reliably and securely connected and disconnected to and from an overhead line in an automatic fashion.

18 Claims, 3 Drawing Sheets

(56) References Cited

U.S. PATENT DOCUMENTS

| | | | | |
|---|---|---|---|---|
| 8,564,253 | B2 * | 10/2013 | Gong et al. | 320/167 |
| 2006/0267748 | A1 * | 11/2006 | Knoop et al. | 340/435 |
| 2010/0270983 | A1 * | 10/2010 | Gong et al. | 320/167 |

FOREIGN PATENT DOCUMENTS

| | | | |
|---|---|---|---|
| DE | 24 60 843 | A1 | 7/1976 |
| DE | 30 15 784 | A1 | 10/1981 |
| DE | 100 12 039 | A1 | 9/2001 |
| DE | 100 54 766 | A1 | 5/2002 |
| FR | 2 506 234 | A1 | 11/1982 |
| JP | 53 006065 | A | 1/1978 |
| JP | 54 022610 | A | 2/1979 |
| JP | 2002139305 | | 5/2002 |
| JP | 2005094952 | | 4/2005 |
| RU | 56283 | U1 | 9/2006 |

OTHER PUBLICATIONS

International Search Report dated Nov. 26, 2012 for corresponding PCT/DE2011/002058.
German translation of Chinese Office Action for Chinese Application No. 201180057711.7, with English machine translation.
German translation of Japanese Office Action for Japanese Application No. 2013-541205, mailed Jul. 22, 2015, with English machine translation.
German translation of Russian Office Action for Russian Application No. 2013129872/11, with English machine translation.

* cited by examiner

SYSTEM FOR AUTOMATICALLY CONNECTING AND A DISCONNECTING CATENARY VEHICLE TO AND FROM THE OVERHEAD LINE DURING TRAVEL

The present patent document is a §371 nationalization of PCT Application Serial Number PCT/DE2011/002058, filed Nov. 24, 2011, designating the United States, which is hereby incorporated by reference. This patent document also claims the benefit of DE 10 2010 053 528.1, filed on Nov. 30, 2010, which is also hereby incorporated by reference.

BACKGROUND

The present embodiments relate to a system that automatically connects and disconnects current collectors to/from overhead contact lines during travel.

Electrically powered vehicles offer many advantages as compared to vehicles that obtain their primary source of energy from combustion engines. Since the efficiency of power storage or the clean generation of power using fuel cells is commonly considered to still be insufficient, power supply via overhead or other contact lines or via power rails provides an alternative. In rail bound vehicles such as trains or streetcars, the prior art is sufficiently practical in practice and widespread. In non-railbound vehicles (e.g., trolleybuses), the limitations of the prior art are so sizable that in many cities, existing systems have been removed and replaced with diesel-powered buses. The key limitation of existing trolleybus methods lies in their insufficient flexibility (e.g., lacking capability that may be achieved only with substantial effort and expense) to also operate the trolleybus without power from the overhead line for a brief period of time.

Electric buses (e.g., trolleybuses and catenary buses) are supplied with power via trolley poles primarily via dual-pole wire systems in the form of overhead lines. The lines are installed at a defined height, generally in the center above the designated lane. In so doing, the lines are not really parallel to one another on account of the manner in which the lines are affixed (e.g., a distance between the lines may be 60 cm and may vary within a range of ten centimeters or more). The height at which the lines are affixed is also subject to a sizable tolerance, ranging between 5 and 6 meters. An even larger tolerance is present with regard to the offset in relation to the middle of the lane, which may amount to as much as 4.5 m for 6.2 m long poles. All of these factors pose an impediment to automatic connection to the overhead line, which is a prerequisite for a series of other application scenarios that may advance the desired electrical mobility essentially enabled with a trolleybus (e.g., in inner-city areas).

The current collectors may be featured as U-shaped collector shoes with swivel action around a vertical and a horizontal axis and located at a tip of each of the two pole current collectors. The collector shoes are pressed via the poles against the overhead lines via a vertically acting upward force so that electrical contact is continuous during the connection phase.

The existing systems are configured so that the current collectors remain connected over the entire distance traveled and are disconnected or are connected only when the vehicle is stopped. Since the construction of the line networks used for the continuous supply of power during the entire journey and maintenance of the line networks (e.g., when the line networks feature overhead switches for double or multiple lines along routes with bidirectional and multi-lane traffic) are expensive, and since the line networks also involve other disadvantages such as esthetic restrictions, preventing the line networks from being installed in historical town centers or in representational areas, for example, it is desirable to operate the vehicle off-wire over more or less short distances.

An additional autonomous supply of energy is to be provided in the vehicle (e.g., via batteries, capacitors, a combustion engine with a generator, fuel cells or a flywheel), and a current collector system that is able to automatically disconnect from and, in particular, reconnect to the wires quickly and reliably is to be provided. Various developments exist that address the question of the provision of power in the vehicle (e.g., dual-mode vehicles that feature a diesel generator on board, or the flywheel energy storage device described in DE 30 15 754 C enabling the generation of power for autonomous operation).

Suggested solutions have also been published on the problem of automatic reconnection (e.g., the controlled guidance of the current collector to the wires). In DE 24 60 843, it is suggested that an engagement aid, or "lug", be vertically installed on either side of the collector shoes running parallel to the direction of travel. The engagement aid is configured to facilitate engagement and upon the contact being established, is folded away in a downwards direction. The disadvantages of this system are that automatic connection using this device may only be made when the vehicle is stopped because the lug, when flipped out, projects into the area of the overhead wire suspension. Guiding the lug to the overhead wire requires manual interaction.

The proposal made in FR 2 506 234 provides an attempt to automate the process and thus reduce the measurement and control effort by affixing both of the current collector shoes to a common support.

The submitted solution of DE 100 54 766 solves the problem of the unreliable parallel positioning of the two overhead wires.

The related patent application of DE 100 12 039 C poses the additional disadvantage that an entirely new and more complex technology and configuration of the overhead wire positioning and suspension is presupposed.

SUMMARY AND DESCRIPTION

The implementation of FR 2 506 234 fails in that the overhead wires are not positioned in an exact predictable distance from one another. The submitted solution of DE 100 54 766 only reduces the control effort for guiding the collector shoes to the overhead line without providing a solution for the situation in which the overhead line is not precisely positioned in the middle of the lane or in a narrow corridor above the vehicle or for the situation in which the overhead line begins or ends while the vehicle is traveling.

What all of the systems of propulsion described above have in common is that it is assumed that the position of the collector poles may be captured in relation to the vehicle and the overhead contact line and that this may be transformed into movement control without having provided suggestions for this. As a consequence, none of these systems has succeeded in being developed for use in practice. Either the entire length of the line is supplied by a continuous overhead wire, or the vehicles travel purely on electric power over specific sections (e.g., in tunnels) and are otherwise diesel-powered. The current collector shoes are engaged in stationary devices, referred to as "funnels", either manually or semi-automatically. Designs that from the outset electrify continuous sections only a few meters long consistently omit, for example, intersections, underpasses, traffic turning left, and steep downhill gradients and consequently are dependent on a reliable and, for example, quick automatic reconnection of the current collectors also while the vehicle is in motion.

The scope of the present invention is defined solely by the appended claims and is not affected to any degree by the statements within this summary.

The present embodiments may obviate one or more of the drawbacks or limitations in the related art. For example, a current collector system and a corresponding method provide fully automatic disconnection and connection of pole current collectors of a vehicle while traveling.

By employing image capturing, image processing and image evaluation pole current collectors may automatically connect to an overhead line and disconnect from the overhead line.

In one embodiment, a device for automatically connecting and disconnecting at least one pole current collector of a vehicle that is configured for operation with at least one overhead line is provided. The device includes at least one actuator that moves the pole current collector, and at least one image capturing and image evaluation unit to control the actuator so that the pole current collector connects to and disconnects from the overhead line. One or more of the present embodiments offers the advantage that the current collectors of a vehicle may be reliably and securely connected to and disconnected from an overhead line in automatic fashion.

In one embodiment, a method for automatically connecting and disconnecting at least one pole current collector of a vehicle that is configured for operation with at least one overhead line is provided. The method includes image capturing of the pole current collector and the overhead line and image evaluating for determining positions of the pole current collector and the overhead line. An actuator forming a mechanical link to the pole current collector is controlled on the basis of image evaluation such that the pole current collector connects to and disconnects from the overhead line.

Vehicles that are equipped with two pole current collectors that connect to and disconnect from two overhead lines may be used. Each of the two pole current collectors forms a mechanical link with at least one actuator. The term "overhead line" is the same as "overhead (contact) wire".

The purpose is also accomplished by a system including stereoscopic moving image cameras and actuators for moving the pole current collectors and the contact shoes. The system also includes intelligent control electronics that determine the position of the overhead wires in relation to both the vehicle and the positions of the contact shoes and the current collector heads via optical pattern recognition on the basis of the data obtained by the video cameras. The system generates commands for the motor-powered and/or hydraulic or pneumatic positioning of the pole current collectors for the connection and disconnection movements on the basis of its calculations and communication with other systems.

The control electronics realize an upper command level that decides whether connection or disconnection is to be done, and a lower command level that monitors the movements of the pole current collector and/or contact shoe. Both levels utilize the information obtained by the cameras (e.g., moving images) and possibly further sensors, via which the relative positions of the contact shoes and overhead lines and also the visual surroundings (e.g., any impediments between the contact shoe and the overhead line) are determined. The upper level may also utilize access to a global navigation satellite system for the purpose of determining the geoposition of the vehicle. The geoposition is synced using a card (e.g., a map) on which the areas with and without an overhead line or interruptions in the overhead line are recorded. The upper level may also utilize car-to-car communication based on digital radio with vehicles equipped in the same manner for the purpose of negotiating resource conflicts (e.g., involving the same overhead line) in which it is decided which of the involved vehicles is to remain connected and which vehicle (or vehicles) is to disconnect (e.g., temporarily disconnect).

Using statistical information (e.g., gained from past use) or other information (e.g., an uphill and downhill gradient profile stored on the card), the upper level may also issue connect and disconnect commands to the lower level for the purpose of resource conservation (e.g., optimizing power usage and minimizing wear).

DETAILED DESCRIPTION OF THE DRAWINGS

Figure 1:
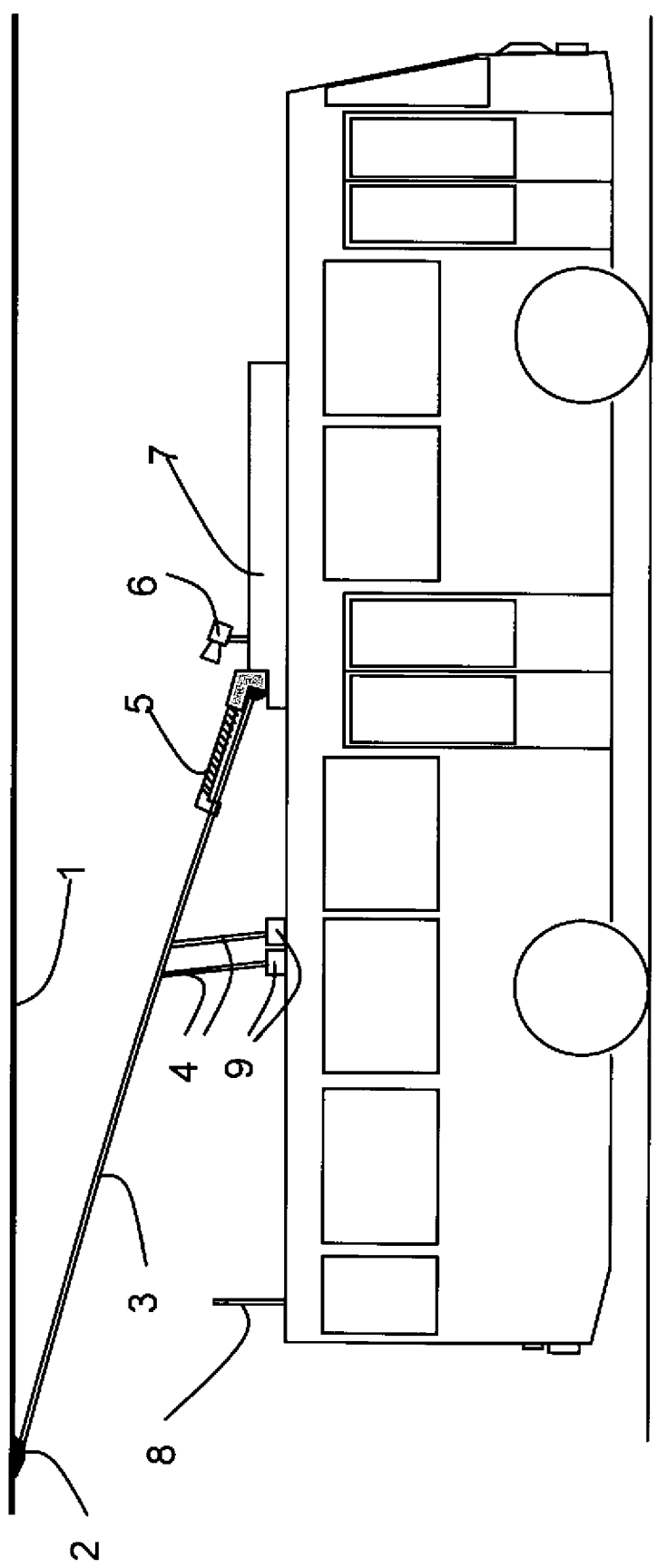
FIG. 1 shows a side view of mechanical components associated with one embodiment of a trolleybus.
Figure 2:
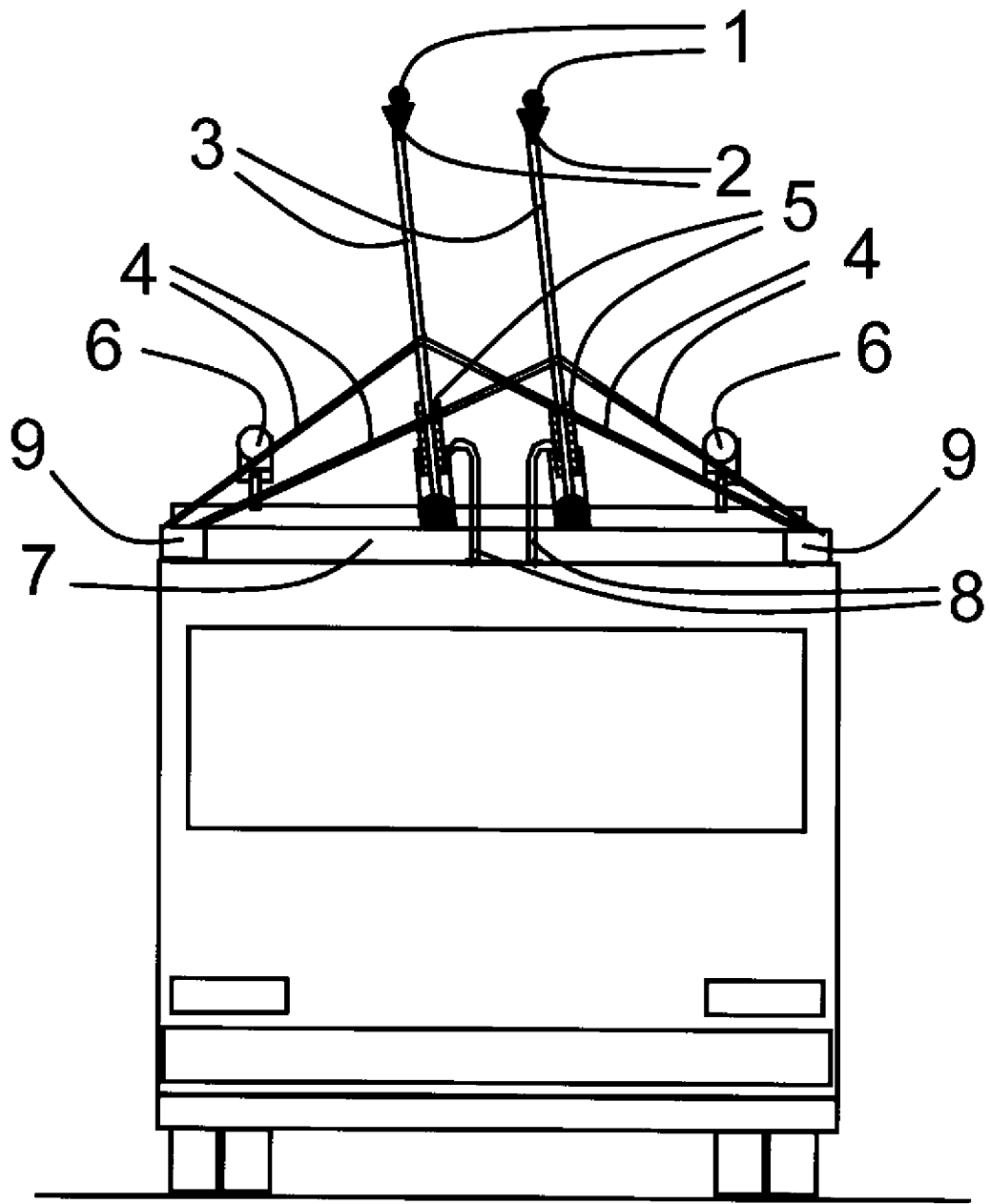
FIG. 2 shows a rear view of one embodiment of the trolleybus of FIG. 1.
Figure 3:
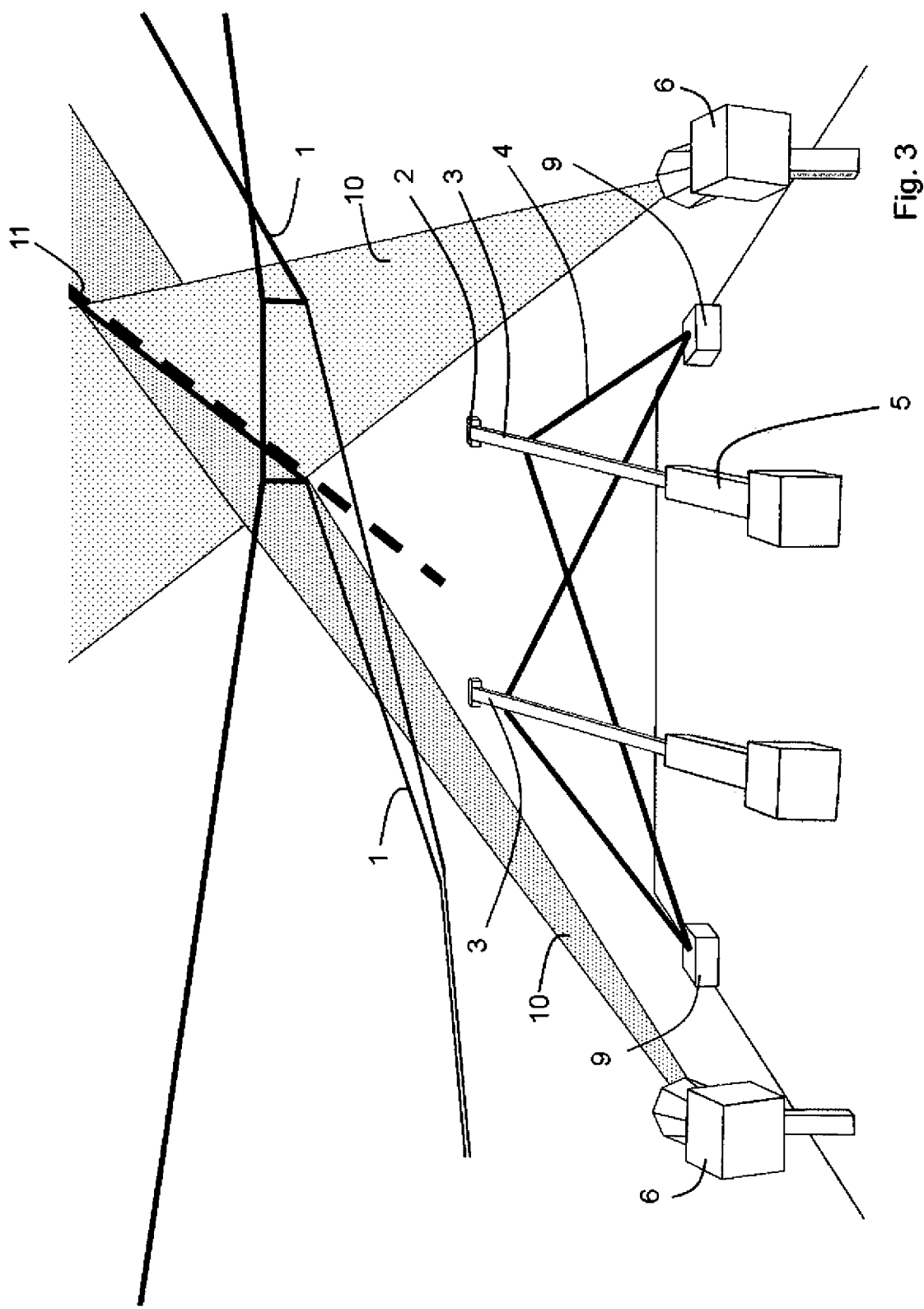
FIG. 3 illustrates one embodiment of a method for determining a position of an overhead line.

The figures show the use of the present embodiments in the context of a trolleybus (e.g., a vehicle) in which an active movement of pole current collectors 3 is effected via arrestor cable motors 9, and arrestor cables 4 are tensioned via a force generated by springs 5 (e.g., compression springs or extension springs). Stereoscopic video cameras 6 are affixed to a roof 7 of the trolleybus and transmit image data to control electronics, also mounted on the roof 7. The control electronics transmit control commands for actuators (e.g., the arrestor cable motors 9).

In so doing, the control electronics utilize one embodiment of a method described below in order to, as needed, position the pole current collectors 3 along with contact shoes 2 as close as possible underneath an overhead line 1, where present, so that electrical contact is made. Relevant control commands for the actuators are generated for disconnecting or may be generated for anchoring the pole current collectors 3 in a locking device 8 in areas in which it is disadvantageous or deleterious to travel while connected according to operating conditions computed by the control electronics or where there is no longer any overhead line within the reach of the pole current collectors 3.

Positions of two overhead wires are identified as two essentially straight lines in a two-dimensional picture of the video images of the stereoscopic video cameras 6, which employ pattern recognition methods. The wires correspond to a "left" wire and a "right" wire. The two wires each establish a plane 10 in relation to the vehicle via inverse projection in three-dimensional space. By performing computations so that the left and right planes of the two images of the two cameras intersect in three-dimensional space (e.g., the left planes intersecting and the right planes intersecting), a left line and a right line 11 are obtained in three-dimensional space, relative to the position of the vehicle. Two current collectors 3 are to be positioned in place from below along the two lines for connection. The position of the contact shoes 2 on the pole current collectors 3 is also determined stereoscopically in space in an analogous manner, corresponding curves via which the contact shoes 2 are guided to the overhead wires are computationally established in space, and the pole mechanism is controlled such that the contact shoes 2 approach the overhead wires proceeding along the computed curves. Since all of this takes place while the vehicle is traveling (e.g., the position of the overhead wires in relation to the vehicle changing), the current and target positions and the control commands derived from the current and target positions are to be constantly recalculated anew.

The method for disconnection is analogous other than, depending on the embodiment, the position of the overhead wires no longer plays a role.

In addition, the control module continuously monitors the overhead wires during the connected and disconnected state so as to answer the following questions: Do the overhead wires proceed outside of a corridor in relation to the vehicle, the corridor being within reach of the contact shoes (e.g., does the vehicle leave the lane area); do the overhead wires return to this corridor; do the overhead wires come to an end; do the overhead wires resume; is there an obstruction underneath the overhead wires (e.g., the contact shoes of another vehicle); may the orientation and speed of movement of the obstruction be determined in relation to the vehicle; is the vehicle currently in a connected or disconnected state?

The advantages achieved with one or more of the present embodiments are that a significant simplification of the line routing may be achieved, while the time during which the vehicle draws power from the overhead line is maximized.

In addition, proven standard components may be used for the mechanical part.

Another advantage is that connection and disconnection may be provided for within the space of a few seconds. This also enables frequent changes of journeys with and without contact to the overhead line and a flexible reaction to unforeseen operating conditions (e.g., driving around an obstacle that has just arisen such as after an accident).

Due to the fully automatic operation enabled, all this may take place without posing a burden to the driver or resorting to manual intervention.

The optical pattern recognition utilizes, for example, the method of tracking a sluggishly moving target in which the future target may be inferred from the movement so far, so that in the event of difficult visibility conditions (e.g., pouring rain or snow), reliable recognition of the overhead wires may be provided. In order to provide reliable function in darkness, small lamps suffice (e.g., infrared LEDs as are frequently integrated in surveillance cameras).

The target tracking method utilizes the following. The dynamic positions of the overhead wires expected on the basis of previous recognitions by extrapolating past movement within a two-dimensional video image are evidenced in the computation of the subsequent situation with a higher probability (e.g., significantly higher probability) in that the pattern being sought is encountered (e.g., encountered again).

In a connected state, the position of the pole current collector or contact shoe computed and possibly determined by sensors may be used for determining the position of the overhead wires.

For verification purposes, the bus driver may also be provided with the image captured by the cameras in the dashboard. The images show the overhead contact lines and pole current collectors. If no overhead contact line is recognized, no connection takes place, or disconnection takes place automatically.

Entry into areas in which vehicle operation is to be done in a connected state (e.g., areas in which overhead wires are installed) is recognized by a global navigation satellite system (e.g., GPS, the American global positioning system, or the future European counterpart Galileo) and an integrated card. Exiting these areas (e.g., at an end of the network), underpasses and tunnels with insufficient clearance for overhead wires, or construction sites forcing the vehicle to depart from a normal lane, is detected in an analogous manner and results in scheduled disconnection. The same applies to turn-offs, which consequently no longer use switches (e.g., overhead switches), as the turn-offs. Turn-offs are costly and subject to wear and tear. The line branching off resumes at an extended distance from the turn-off, and vehicles turning off disconnect briefly in this area and reconnect to the new line. The same applies to intersections with other overhead lines and intersections of trams and trains at which the intersecting pair of overhead contact lines or one of the two intersecting pairs of overhead contact lines is interrupted briefly. Also, areas in which overhead wires would be intrusive for esthetic or other reasons may be omitted using this approach.

In a disconnected state, the vehicle may draw power from a storage device (e.g., flywheel, battery or capacitors) and/or from a supplementary combustion engine (auxiliary power unit (APU), hybrid operation or fuel cell).

The storage device, where present, is recharged using recuperation energy and/or from the overhead wire. Alternatively or additionally, the storage device may be recharged from the APU employing intelligent heuristics in the control module pertaining to the expected subsequent use of the storage device, the route yet to be traveled by the vehicle and its energy requirement profile being known.

In one embodiment, the integrated card may be updated as needed via digital radio (GSM/UMTS or trunked radio) also while the vehicle is traveling.

The optical control module enables a continuous comparison to be made between the card (e.g., target) and the present situation. Where a discrepancy occurs (e.g., overhead wire unexpectedly missing), feedback is given to the driver and transmitted via digital radio to an operations center.

The optically captured data is continuously recorded in a ring buffer (e.g., silicon disk; video as log) and may be used for subsequent problem analysis.

Scheduled disconnection in sections (e.g., extended sections) in which little operating power is used or little recuperation energy is recovered (e.g., an extended section with a slight gradient) may be used to reduce wear to the current collector and the overhead contact wires.

Sections of this kind may be featured entirely without any overhead wire.

In areas with two-way traffic, a common overhead line may be used for both directions of travel, local conditions permitting. When two buses meet, the two vehicle control modules automatically negotiate via digital radio which of the two buses will disconnect briefly until the two buses have passed one another (e.g., car-to-car communication). Priority rules may be stored on the card so that the bus that may be expected to draw less power from the network is disconnected. The circumstance that two buses will meet may be detected via digital radio (e.g., position reporting of the individual buses) or via transponder. Any failure of automatic communication (e.g., outage of digital radio) may be detected via the optical surveillance and results in the emergency disconnection of both buses.

Disconnection is also initiated while passing, whether detected automatically or explicitly announced by the driver, and may also be initiated where there are parallel lanes proceeding in the same direction with a jointly used overhead line.

Automatic disconnection also occurs when the target area of the pole current collector leaves the area of the overhead wires (e.g., when going around a construction site or an accident). Automatic reconnection takes place as soon as the bus has traveled a sufficient distance back into the area of the overhead wires.

The result is a system that economically provides for high operational reliability.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A device for automatically connecting and disconnecting at least one pole current collector of a vehicle configured for operation with at least one overhead line, using at least one actuator that moves the at least one pole current collector, the device comprising:
    at least one image capturing and image evaluation unit that is configured to control the at least one actuator such that the at least one actuator moves the at least one pole current collector and the at least one pole current collector connects to or disconnects from the at least one overhead line,
    wherein the at least one image capturing and image evaluation unit is configured to control the at least one actuator via pattern recognition.

2. The device according to claim 1, wherein the at least one image capturing and image evaluation unit comprises stereoscopic cameras operable to capture a stereoscopic image of the at least one pole current collector and the at least one overhead line.

3. The device according to claim 2, further comprising an electronic circuit with communication and storage elements operable to position a contact shoe of the at least one pole current collector on the basis of a signal of the stereoscopic cameras and other input variables via control commands to the at least one actuator such that electric contact of the contact shoe is establishable with the at least one overhead line.

4. The device according to claim 1, wherein the at least one pole current collector comprises two pole current collectors, each of the two pole current collectors having one contact shoe,
    wherein the at least one overhead line comprises two overhead lines, and
    wherein the at least one actuator comprises at least two actuators that separately or jointly move the two pole current collectors.

5. The device according to claim 1, further comprising an electronic circuit with communication and storage elements operable to position a contact shoe of the at least one pole current collector on the basis of a signal of the stereoscopic cameras and other input variables via control commands to the at least one actuator such that electric contact of the contact shoe is makeable with the at least one overhead line.

6. A method for automatically connecting and disconnecting at least one pole current collector of a vehicle configured for operation with at least one overhead line, the method comprising:
    image capturing, by an image capturing and image evaluation unit, the at least one pole current collector and the at least one overhead line;
    image evaluating, by an image capturing and image evaluation unit, for determining a position of the at least one pole current collector and the at least one overhead line; and
    controlling, by an image capturing and image evaluation unit, an actuator forming a mechanical link to the at least one pole current collector based on the image evaluating such that the at least one actuator moves the at least one pole current collector and the at least one pole current collector connects to or disconnects from the at least one overhead line,
    wherein the image evaluating comprises pattern recognition.

7. The method according to claim 6, wherein the image capturing and the image evaluation take place stereoscopically.

8. The method according to claim 6, wherein the image capturing comprises capturing two-dimensional images with cameras, and
    wherein the method further comprises:
        determining, with a control system, commands for the actuator based on a computed position of the at least one overhead line and a contact shoe of the at least one pole current collector, wherein the determining comprises:
            identifying the at least one overhead line as a substantially straight line via the two-dimensional images captured by the cameras;
            computing two substantially level planes in three-dimensional space relative to the vehicle based on the substantially straight line, a projection of the substantially level planes resulting in substantially straight lines in the two-dimensional images and the at least one overhead line running in the substantially level planes;
        obtaining a substantially straight line relative to the vehicle in space as an intersection set based on an intersection of the substantially level planes; and
        determining a position of an associated contact shoe of the at least one pole current collector stereoscopically in space as an approximate intersection of lines in space that are determined by projecting an appropriately selected point of the contact shoe in both of the two-dimensional images.

9. The method according to claim 8, further comprising:
    issuing a command for connection or disconnection for applying the at least one pole current collector to the at least one overhead line or for retracting, anchoring, or retracting and anchoring the at least one pole current collector in a pole locking device, respectively, by a higher level in the control system, the control system being based on a digital map on which areas in which the vehicle is to be operated in a connected state are marked on a route map, the issuing comprising issuing the command for disconnection when the vehicle leaves the areas or issuing the command for connection when the vehicle reaches the areas; and
    determining a position of the vehicle on the digital map via a global navigation satellite system.

10. The method according to claim 8, wherein the at least one overhead line resumes after a turn-off, and
wherein the control system ensures that the vehicle, when turning off, briefly disconnects in a switch area and reconnects to the at least one resuming overhead line.

11. The method according to claim 8, further comprising:
initiating, by the control system, a disconnection such that when the vehicle encounters another vehicle equipped in the same manner or passes the other vehicle using the same at least one overhead line, the vehicle and the other vehicle communicate with one another via a digital radio link and cooperatively determine whether the vehicle or the other vehicle disconnects.

12. The method according to claim 8, further comprising initiating, with the control system, disconnection when the pattern recognition signals an unforeseen interruption or an obstacle.

13. The method according to claim 8, further comprising:
establishing, with the control system, on the basis of a previous position of the at least one overhead line as a substantially straight line in space and a motion vector of the vehicle that results from a previous differential speed and a current differential speed and orientation in a street space and relative to the at least one overhead line, corresponding new possible position for the at least one overhead line as a line in the two-dimensional images of the cameras; and
using the new possible position in the pattern recognition.

14. The method according to claim 9, further comprising computing, with the control system via the digital card on which the route to be traveled by the vehicle is entered in combination with position determination and statistical methods in the form of continuously acquired empirical values for the purpose of energy optimization, in which areas secondary energy from an energy storage device will be needed,
wherein an elevation profile of terrain is referenceable for determining sections with an uphill or downhill gradient, in order to disconnect for the purpose of minimizing wear in the sections with the downhill gradient.

15. The method according to claim 8, further comprising determining, with the control system, an energy flow in the vehicle employing an expected consumption profile such that when the vehicle is in a connected state, a portion of an operating energy is drawn from an energy storage device or recuperative energy is fed into a line network from traction motors or from the energy storage device, or such that simultaneous charging of the energy storage device takes place via the at least one overhead line.

16. The method according to claim 12, wherein the unforeseen interruption or the obstacle comprises a pole current collector of another vehicle where digital radio communication is impaired, when an obstacle is detected by mechanical sensors, or when a vehicle driver issues a relevant command.

17. The method according to claim 16, wherein the obstacle detected by the mechanical sensors comprises an optically undetected current collector of the other vehicle.

18. A device for automatically connecting and disconnecting at least one pole current collector of a vehicle configured for operation with at least one overhead line, using at least one actuator that moves the at least one pole current collector, the device comprising:
at least one image capturing and image evaluation unit configured to:
image capture the at least one pole current collector and the at least one overhead line;
image evaluate to determine a position of the at least one pole current collector and the at least one overhead line; and
control the at least one actuator based on the image evaluation such that the at least one actuator moves the at least one pole current collector and the at least one pole current collector connects to or disconnects from the at least one overhead line, the at least one actuator forming a mechanical link to the at least one pole current collector,
wherein the at least one image capturing and image evaluation unit is configured to control the at least one actuator via pattern recognition.

* * * * *